US007248284B2

(12) United States Patent  
Pierce

(10) Patent No.: US 7,248,284 B2  
(45) Date of Patent: Jul. 24, 2007

(54) CALIBRATION TARGETS FOR DIGITAL CAMERAS AND METHODS OF USING SAME

(76) Inventor: Edward Alan Pierce, 137 Timberbrook La. #302, North Potomac, MD (US) 20878

( * ) Notice: Subject to any disclaimer, the term of this patent is extended or adjusted under 35 U.S.C. 154(b) by 597 days.

(21) Appl. No.: 10/636,738

(22) Filed: Aug. 8, 2003

(65) Prior Publication Data

US 2004/0027456 A1 Feb. 12, 2004

Related U.S. Application Data

(60) Provisional application No. 60/402,603, filed on Aug. 12, 2002.

(51) Int. Cl.  
*H04N 17/00* (2006.01)  
*H04N 17/02* (2006.01)  
(52) U.S. Cl. ................. 348/188; 348/187; 348/175; 348/208.12
(58) Field of Classification Search ........ 348/187–188, 348/175–176, 208.12, 222.1, 223.1, 221.1, 348/229.1; *H04N 17/00, 17/02*  
See application file for complete search history.

(56) References Cited

U.S. PATENT DOCUMENTS

| | | | |
|---|---|---|---|
| 3,952,144 A | 4/1976 | Kolker | |
| 4,236,795 A | 12/1980 | Kephart | |
| 4,575,124 A * | 3/1986 | Morrison | ............. 283/115 |
| 4,671,661 A | 6/1987 | Ott | |
| 4,706,131 A | 11/1987 | Perten et al. | |
| 4,771,305 A | 9/1988 | Potoroka | |
| 5,118,183 A | 6/1992 | Cargill et al. | |
| 5,475,460 A | 12/1995 | Stephenson et al. | |
| 5,621,217 A | 4/1997 | Seachman et al. | |
| 5,699,440 A | 12/1997 | Carmeli | |
| 5,760,829 A * | 6/1998 | Sussmeier | ............. 348/187 |

(Continued)

FOREIGN PATENT DOCUMENTS

WO  WO 01/89205 A1  11/2001

OTHER PUBLICATIONS

JP10063047A2: Image Forming Device And Controller And Control Method Therefor, (Mar. 6, 1998).

(Continued)

*Primary Examiner*—Trang U. Tran  
(74) *Attorney, Agent, or Firm*—Millen, White, Zelano & Branigan, P.C.

(57) ABSTRACT

Calibration targets for use with digital cameras comprise black and white target areas to which digital cameras are exposed simultaneously to provide proper settings for highlight and shadow sensitivity prior to making a digital photograph. In addition a white or gray neutral target area, without color bias, is provided, to which the digital cameras are exposed to provide desired settings for color balance prior to making digital photographs. In one embodiment of the calibration target, the black and white target areas are on one side of a panel and the white or gray neutral target area is on the other side of the panel. In accordance with methods of calibrating digital cameras and to methods of photography, the image of the black and white target areas is adjusted by viewing a histogram display thereof and adjusting exposure settings until spikes in the histogram representing black and white detection are equally balanced between boundaries with no lateral offset.

31 Claims, 10 Drawing Sheets

U.S. PATENT DOCUMENTS

| | | | |
|---|---|---|---|
| 5,809,366 | A | 9/1998 | Yamakawa et al. |
| 5,821,993 | A | 10/1998 | Robinson |
| 5,828,793 | A | 10/1998 | Mann |
| 6,366,680 | B1 | 4/2002 | Brunk et al. |
| 6,437,823 | B1 | 8/2002 | Zhang |
| 6,542,185 | B1 * | 4/2003 | Bogardus ................ 348/223.1 |
| 6,560,410 | B2 * | 5/2003 | Ichikawa et al. ............. 396/2 |
| 6,768,509 | B1 | 7/2004 | Bradski et al. |
| 6,798,446 | B2 * | 9/2004 | Maggi .................. 348/207.99 |
| 2001/0045980 | A1 | 11/2001 | Leonard |

OTHER PUBLICATIONS

JP3298025B2: (Jul. 2, 2002).
JP11088855: Image Processing Unit, (Oct. 13, 2000).
JP05020271, Yamakawa et al. (Sep. 15, 1998).
Monitor Calibration Screen-PWC Photo, http://www.pwc.photo.com/Calibration, pp. 1-4.
FORS1 Integration, http://216.239.41.100/search?q-cache:1MYQ1FePTrYC: www.eso.org/instruments/fors, pp. 1 and 2.
Starship Modeler, Photography for Modelers, http://216.239.41.100//search?q=cache:sf XRGGe5OUC.www.starshipmodeler.com.tec.
Gamma & Density Co., http//216.239.41.100/search?q-cacheN:nPEaRkBv3zsC:www.gammaanddensity.com/sy, pp. 4-6.
Article: Through The Eyes Of A Professional Observer (Lick Vulcan Camera Project) Peggy Bernard.
Notices: Means, pp. 1-7.
Notices: Claims, pp. 1 and 2.
Notices: Detailed Description, pp. 1-8.
Notices: Technical Field, p. 1.
Notices: Description of Drawings, pp. 1 and 2.
Notices: Drawings, pp. 1-4.
How Digital Cameras Work: http://electonics.howstuffworks.com/digital-camera.hm/printable, pp. 1-18.
ISO vs EI Speed Ratings for KODAK Films.

* cited by examiner

Uncorrected Image

Corrected Image

CALIBRATION TARGETS FOR DIGITAL CAMERAS AND METHODS OF USING SAME

RELATED APPLICATIONS

This application claims the benefit of the filing date of U.S. Provisional Application Ser. No. 60/402,603 filed Aug. 12, 2002 and incorporated herein in its entirety by reference.

FIELD OF THE INVENTION

The present invention is directed to calibration targets for digital cameras and methods of using same. More particularly, the present invention is directed to calibration targets for selecting exposure settings and achieving white balance in digital cameras and to methods for using the targets.

BACKGROUND OF THE INVENTION

In contrast with the digital photography, film photography traditionally has an exposure tolerance of two to four stops. An original scene exposed within this tolerance range will retain a good quality tonal curve due to the film, which is the recording medium, having a light sensitivity range which exceeds the tonal extremes in an average scene of two to four stops. Exposure for digital photography has a very narrow range, so that when there is over exposure or under exposure, part of the information is lost. Consequently, unless you initially achieve the desired exposure you make an inferior image file which will not be in full detail either in highlight areas or shadow areas. There is no way to retrieve these lost details for the image file. Consequently, in digital photography techniques have evolved to fix images after they have been taken. This is a time consuming and relatively expensive undertaking in which it is still very difficult to compensate for information missing from an image.

Inside digital cameras there is a sensor on which a latent light impression of an original scene is made. Based on latent information from the sensor, a central processing unit in the camera processes the information into a proper color spectrum and into a proper color curve that retains the detail from highlight to shadow. The quality of image produced using the latent light impression frequently has diminished quality due to exposure error.

All sensors inside cameras have an optimal sensitivity setting (ISO), whether it is due to the sensitivity of film or to the sensitivity of image sensors in digital cameras. Sensitivity has an optimal range where it produces the absolute best image file in terms of color fidelity with the least image defects. In producing an optimal image file, the image file will be given a rated ISO, e.g., 100. Digital cameras have the capability of shooting other ISOs, but as one deviates from the optimum image quality suffers. When deviating from the optimal ISO, noise is introduced into the image files from the CPU and arbitrary abnormalities known as artifacts become visually apparent and the quality and color degrade. Thus, producing optimal digital image files is difficult for the professional photographer and extremely difficult for the consuming public.

Hand held light meters do not adequately compensate for inaccuracies in exposure because tolerances are typically plus or minus a half stop of exposure. Typically light meters select a middle tone, the placement of which varies from one manufacturer to another. Since light meters peg the middle of the tonal curve, light meters select gray rather than the black and white extremes. Pegging the middle of the tonal curve can result in the photographer loosing information at one or the other extreme so that light metering does not work effectively. This forces camera manufactures to develop methods to fix latent information. In order to compensate for inadequate latent information, camera manufacturers provide you with software solutions for manipulating improperly exposed and color balanced images. But, these "back end fixes" almost invariably produce inferior image files with which before you can even start to produce a print, require very labor intensive efforts having three times the amount of work to process an image file. Accordingly, there is a need for a technique to correctly set exposure and color balance on the front end, i.e. prior to recording a image.

Obtaining correct exposure is part of the problem, the other part being correcting white balance. Most digital cameras provide different options for white balance correction which may be automatic or set by the photographer. Such settings are ball park settings based on daylight, flash, overcast sky, tungsten filament lighting or fluorescent lighting. Daylight varies depending on the time of day with the color temperature being different at morning, midday and afternoon. There are also differences in white balance due to brightness of tungsten light bulbs because brightness determines color temperature. Since current white balance settings for digital cameras are quite inaccurate, there is a need for improvement.

In view of the aforementioned considerations, in digital photography there is need for improvement in the ability to select correct or desired exposure settings, as well as a need for improving the ability to correct or select desired white balance settings.

SUMMARY OF THE INVENTION

The present invention is related to a calibration target and to methods of calibrating digital cameras prior to exposing an image of an original scene to an image sensor within the camera by exposing the image sensor to the calibration target located at the original scene.

The calibration target has a substantially white target area which reflects substantially all wavelengths of visible light and a substantially black target area which absorbs substantially all wavelengths of visible light, which calibration target when focused upon achieves an exposure setting for the digital camera. The exposure setting is then adjusted for the target until an adjusted exposure setting for black and white detection is substantially balanced within the camera for a selected intensity and distribution of light at the original scene. The adjusted exposure setting is then applied to at least one image photographed at the scene.

In a further aspect of the invention, at least one substantially gray target area is provided and exposed simultaneously with exposure to the black and white target areas in order to assist the photographer in centering black and white spikes on a histogram display on the camera.

In still a further aspect of the invention, the adjusted exposure setting for an exposure balanced image is exposed to a substantially neutral, white or gray target area without color bias that reflects equally substantially all wavelengths of light to produce settings for a color balanced, calibrated image having a selected white balance for the original scene.

In still another aspect of the invention, adjusting the exposure is performed by viewing a histogram display within the digital camera and adjusting the exposure settings until spikes representing black and white detection are not offset laterally in the histogram display.

In still another aspect of the invention, an initial exposure setting is obtained of the location prior to exposing the image sensor to the calibration target. The initial exposure setting is then adjusted with subsequent exposures to the calibration target to achieve correct or desired exposure settings.

The present invention is also directed to a target configured for calibrating digital cameras prior to exposing images of original scenes to image sensors within the cameras. The target configuration comprises at least a white target area reflecting substantially all wavelengths of visible light incident thereon and at least a black target area absorbing substantially all wavelengths of visible light incident thereon. The white and black target areas have substantially equal areas, wherein simultaneous exposure of the image sensors to the target at locations of original scenes determines desired exposure settings for images positioned at the scenes.

In a further aspect of the invention, the target further includes at least one middle gray target area which reflects substantially all wavelengths of light without color bias.

In still a further aspect of the invention, the target includes a neutral white or gray target area without color bias, which neutral area when positioned at locations of scenes prior to recording images of the scenes, determines settings for desired color balances for the images.

In a further aspect of the invention, the target configuration is a panel having black and white target areas on a first side and the neutral target area on a second side of the panel.

The invention further relates to a method of digital photography utilizing the aforedescribed calibration methods and calibration targets.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
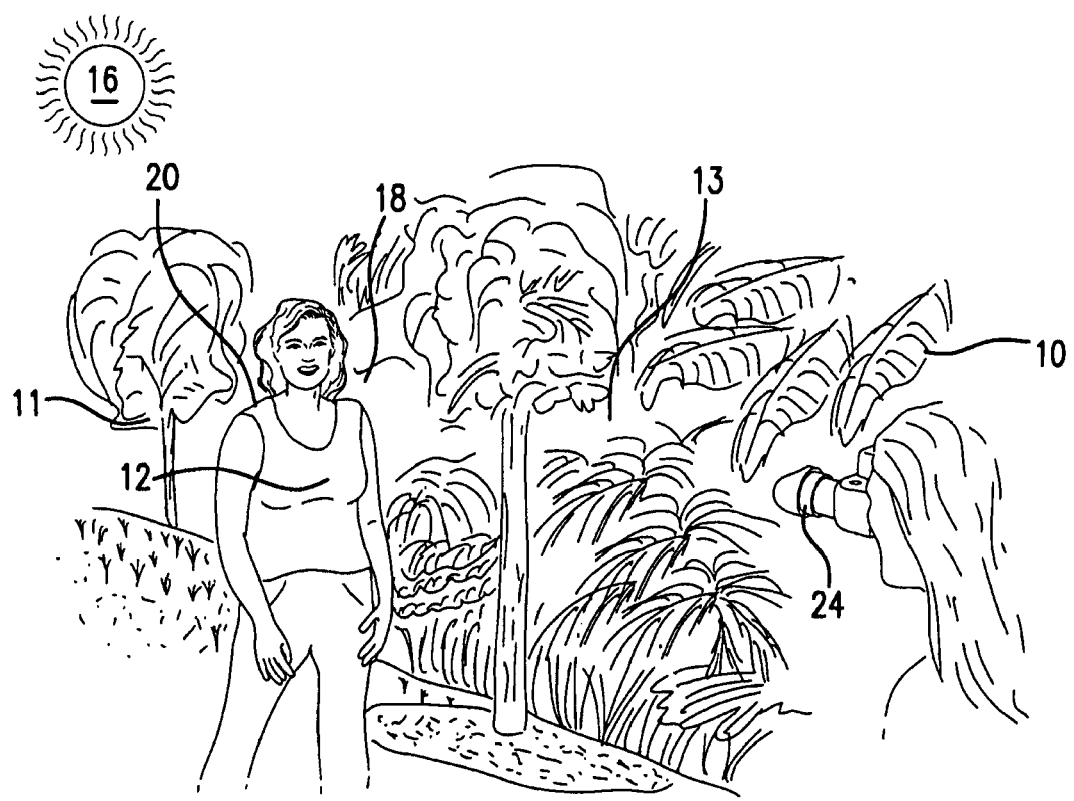
FIG. 1 is a perspective view of a scene to be photographed.

Referring now to FIG. 1 there is shown a location 10 at which an original scene 11 is disposed, which scene may include a subject 12 to be photographed and a background 13. The location 10 may be any location and the scene 11 may be any scene with any particular object 12, or no particular object. The background 13 may be any background. The scene 11 is illuminated by a light source 16, which may be any light source, for example, a lamp, the sun, a photo flash or indirect light, which illuminates the location 10 of the scene 11.

The scene 11 has shadows 18 and highlights 20. The shadows 18 and highlights 20 may be definite and readily apparent, or may be subtle. For any subject 12, the shadows and highlight are usually intermingled, varied and complex.

The subject 12 and background 11 also has colors and tones, which may vary widely and interact with highlights and shadows to produce a visual image of the original scene 11. A digital camera 24 having a lens, focuses the scene 11 on image sensors in the camera that record light electronically. Typically, in digital cameras the image sensors are charged coupled devices (CCD) or complimentary metal oxide semiconductor (CMOS) devices. A computer device in the form of a central processing unit (CPU) converts electrical charges from the image sensors into digital data which is then stored as digitalized image information in the camera's memory.

Figure 2:
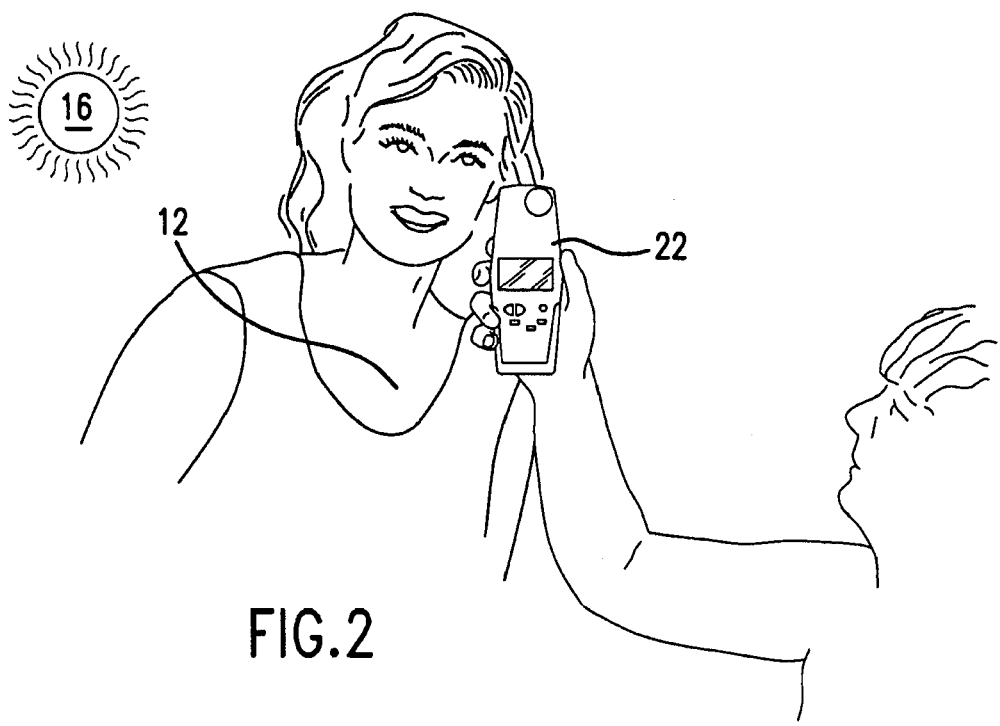
FIG. 2 is a perspective view of a portion of the scene of FIG. 1 showing a light meter being employed to select exposure settings.

As is seen in FIG. 2 a light meter 22 takes a reading proximate the subject 12 to determine initial exposure settings for the camera 24.

Figure 3:
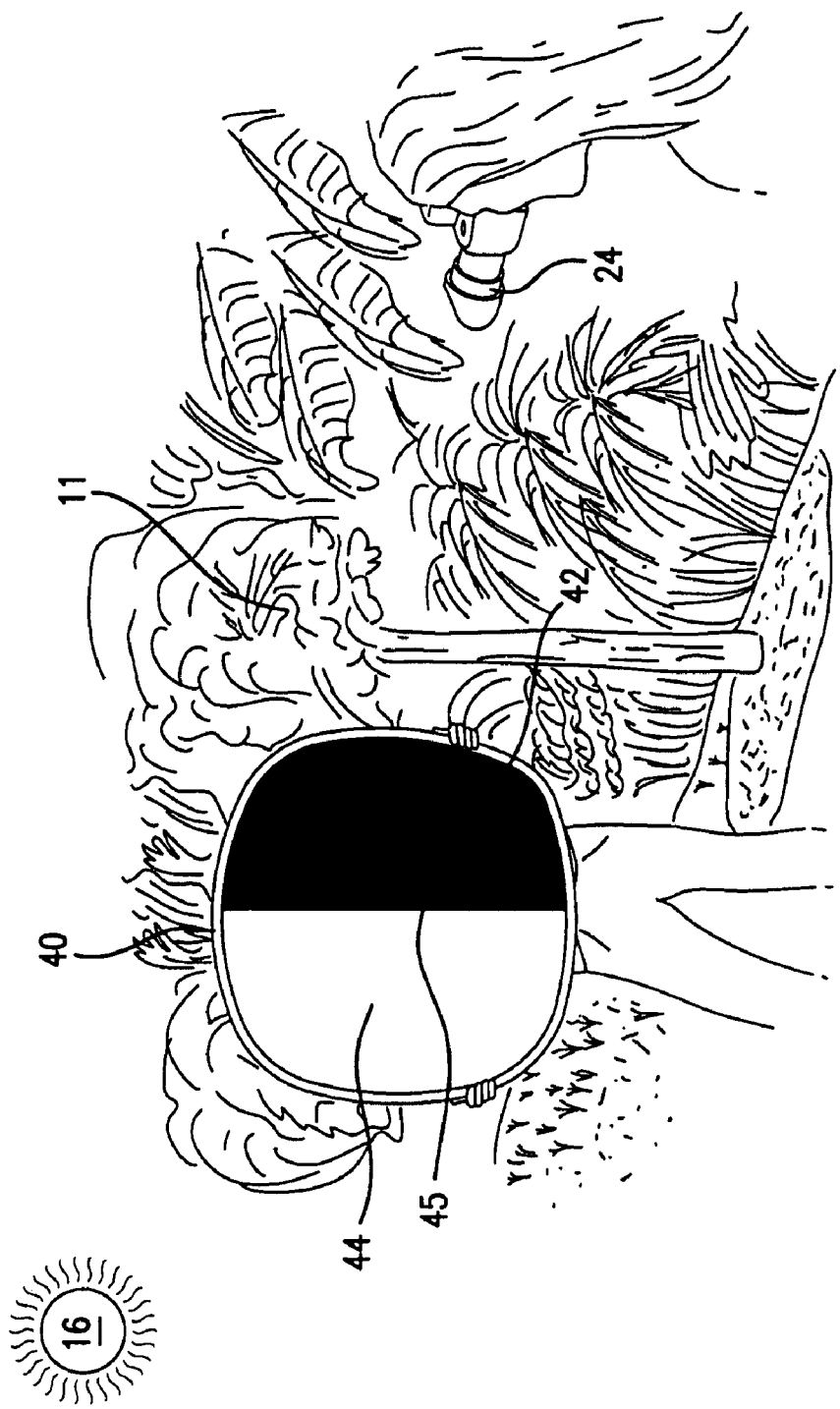
FIG. 3 is a perspective view showing a first embodiment of a calibration target configured in accordance with the present invention.
Figure 4:
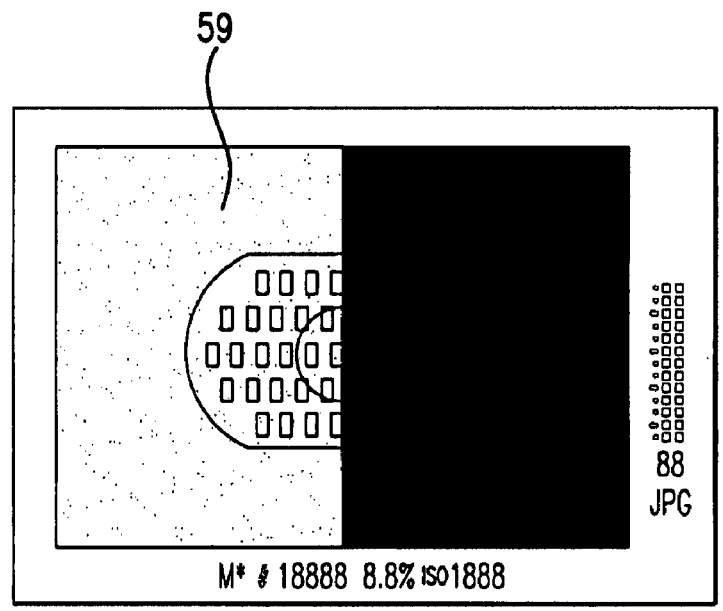
FIG. 4 is an uncorrected image of the calibration target of FIG. 3 in a view finder of the camera.

As is seen in FIG. 3, a calibration target 40, configured in accordance with the principles of the present invention, is inserted into the scene 11 at the approximate location of the subject 12 (if there is a subject). The calibration target 40 has a black target area 42 which absorbs substantially all wavelengths of visible light incident thereon from the light source 16 and a white target area 44 which reflects substantially all wave lengths of visible light incident thereon from the light source 16. The black and white target areas 42 and 44 cover substantially equal portions of the target 40. In the illustrated example, the target areas 42 and 44 are approximately rectangular with curved sides and separate from one another at line 45, however it is only necessary that the black and white target areas have the same amount of area. Accordingly, the black and white areas may have a checker board configuration or may be in the form of writing or a logo. For example, the white area 44 may form a background for the black area 42 which is in the form of writing with perhaps a logo or other design also in black. It is emphasized that the black and white target areas 42 and 44 need only be equal in area, but may have any desired configuration. While the black and white target areas 42 and 44 are illustrated as being on a panel, these areas may be on separate cards which are juxtaposed with one another, may be on adjacent sides of a carton, on a poster, on a screen or on a folded insert packaged with a digital camera.

The black and white target areas 42 an 44 are neutral in that they contain no color cast, the black target area 42 being substantially pure black and the white target area 44 being substantially pure white. The target 40 is not limited to specific size constraints or materials provided that it's reflective qualities are pure black and pure white.

Referring now to FIGS. 4-7 in conjunction with FIG. 3, the method of the present invention is practiced by focusing the camera 24 on the calibration target 40 and setting the camera to a "image and histogram" or "histogram only" display 50 (see FIGS. 5 and 7) on the LCD display panel of the camera 24. Care is taken to ensure the light falling on the calibration target 40 is of the same intensity as the light which will be illuminating the subject 12 (FIG. 1). In otherwords, if the source 16 of light is the sun providing full illumination, then the illumination falling on the target should be full sunlight and not sunlight obscured by clouds or haze. If the light falling on subject 12 is from a cloudy sky, then the light on the calibration target 40 should be from the same cloudy sky. If the light source is a tungsten lamp, then the same lamp at the same position is used for the calibration target 40 as for the subject 12.

Figure 5:
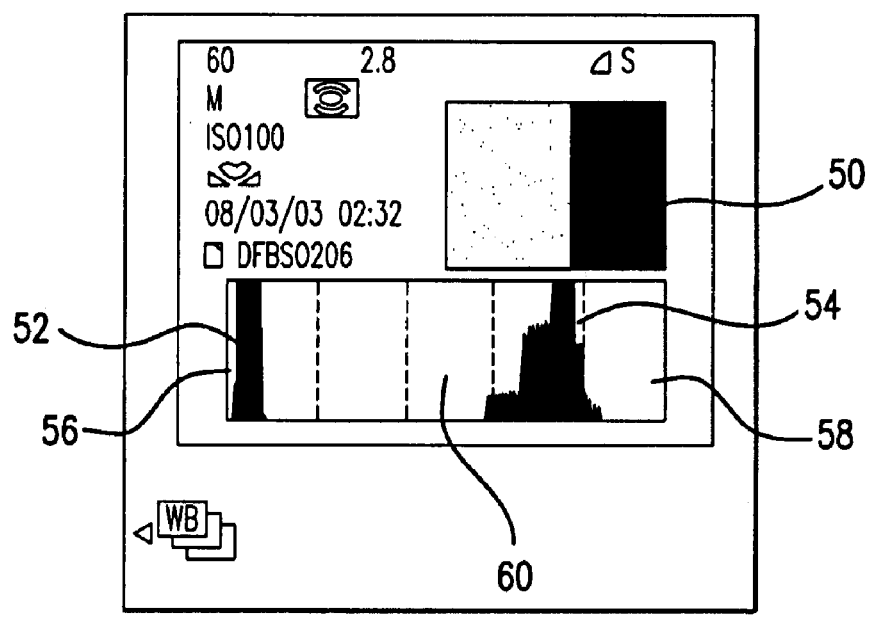
FIG. 5 is a histogram display of the uncorrected image of FIG. 4.
Figure 6:
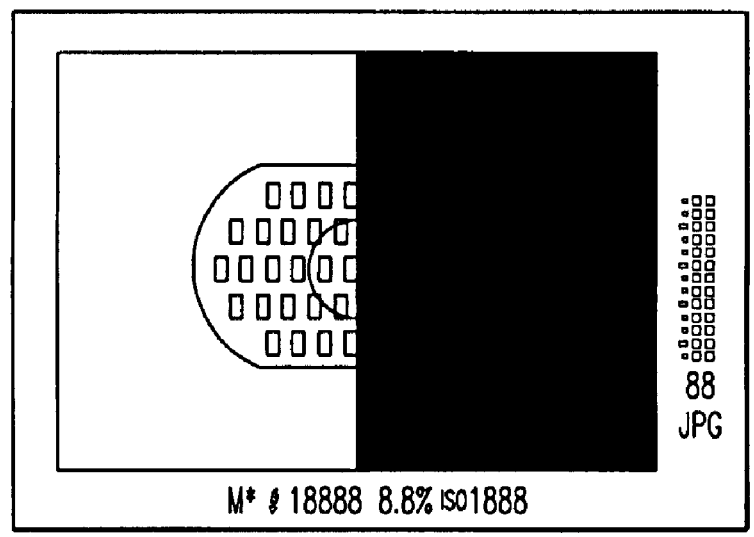
FIG. 6 is a corrected image of the calibration target of FIG. 3 in the view finder of the camera.
Figure 7:
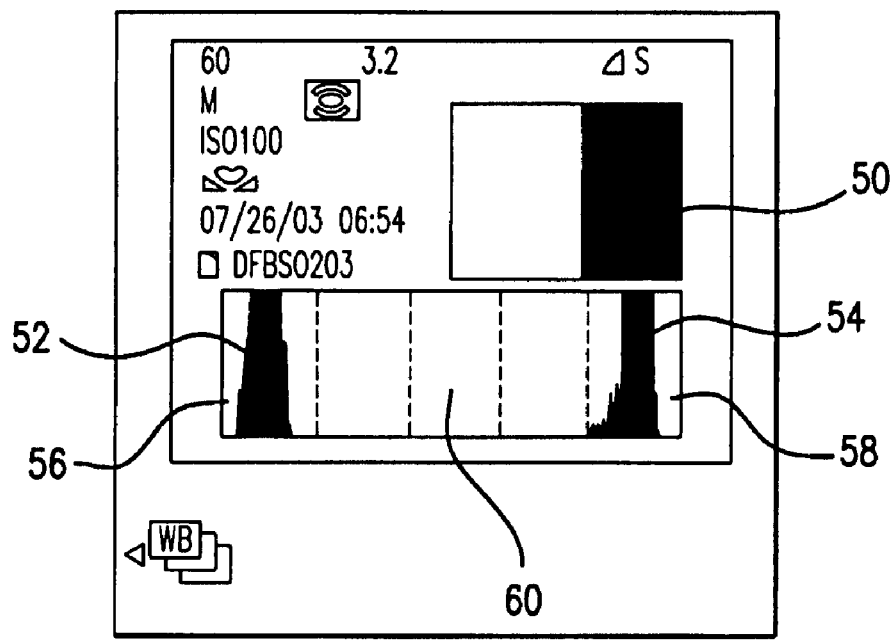
FIG. 7 is a histogram display of the corrected image of FIG. 6.

Preferably in practicing the method of the invention, an initial exposure is made using the camera's internal light meter or a handheld light meter 22 to provide initial exposure settings (see FIG. 2). As is seen in FIG. 5 this results in a histogram display 50 with two distinctive spikes 52 and 54 representing an initial exposure settings. The spike 52 represents black and the outside spike 54 represents white. Typically, the first exposure using the cameras internal light meter or an external light meter 22 will result in a histogram similar to FIG. 5 in which the black and white spikes 52 and 54 are shifted with respect to a left side boundary line 56 or a right side boundary line 58. The exposure settings of the camera 24 are then adjusted to move the spikes 52 and 54 to be equally contained in the area 60; equally balanced between the boundaries 56 and 58, and not offset to either the right or left side.

A second exposure (FIG. 3) is made to see if the spikes 52 and 54 remain in the area 60 and equally balanced between the left and right boundaries 56 and 58, respectively and not offset to either the right or left side. If the spikes 52 and 54 both remain in the area 60 and are equally balanced between the boundaries 56 and 58 with no lateral offset, the exposure settings are correct and the digital camera 24 is properly calibrated to photograph the subject 12, once the subject is returned to the scene 11 (if there is a subject 12) (see FIG. 1). If the black and white spikes 52 and 54 are still not both in the area 60 and equally balanced between boundaries 56 and 58 with no lateral offset, then the exposure settings of the camera are again adjusted and another exposure made to see if the spikes 52 and 54 are equally balanced within the left and right boundaries 56 and 58. The process of adjusting settings and then exposing image sensors in the camera to the calibration target 40, with the adjusted settings, and then viewing the additionally adjusted histogram display is continued until the spikes 52 and 54 are in the area 60 and equally balanced between the left and right boundaries 56 and 58 with no lateral offset. This may take a single adjustment or several adjustments to achieve. In any event, the subject 12 may now be digitally photographed with exposure settings properly set so that highlights and shadows of the photographed image of the original scene 11 will correspond to the original scene.

While a histogram display 50 is used in accordance with one embodiment of the invention, the characteristics of the histogram display are sensed electronically in another embodiment of the invention (not illustrated) and centered automatically by the CPU of the camera 24. In this alternative embodiment values assigned to the locations of black and white spikes 52 and 54 are compared to values assigned to the boundaries 56 and 58. After exposing the image sensors in the camera 24 initially to the camera's internal light meter or a hand held light meter 22 to obtain values for initial exposure settings corresponding to the positions of values for spikes 52 and 54, the camera is focused on the calibration target 40 and another exposure made. The value for the settings for this exposure are then compared to the values for the boundaries 56 and 58. If the calibration target values fall between the values for the boundaries 56 and 58, the exposure settings are calibrated. If not, an additional exposure is made or several additional exposures are made, until the values for the black and white spikes 52 and 54 do fall between the values for the boundaries 56 and 58.

The additional exposures may be done manually or automatically using a sequence of exposures with the histogram display simply informing the photographer visually or audibly that the exposure settings are correct.

While an initial exposure based on light meter readings would appear desirable, when using an automatic sequence of exposures this step could be either dispensed with or incorporated into the sequence, relying preferably on he camera's internal light meter.

Figure 10:
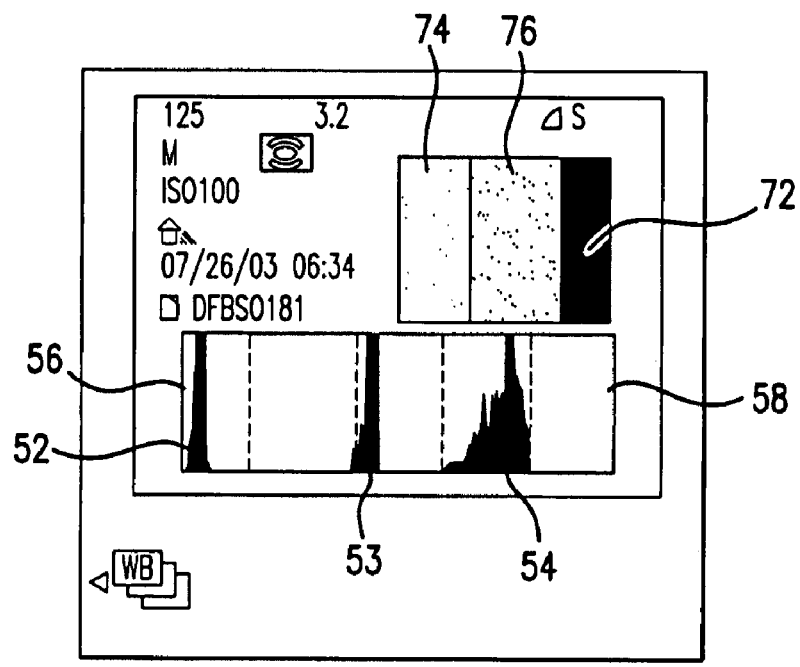
FIG. 10 is a histogram display of the uncorrected image of FIG. 9.
Figure 11:
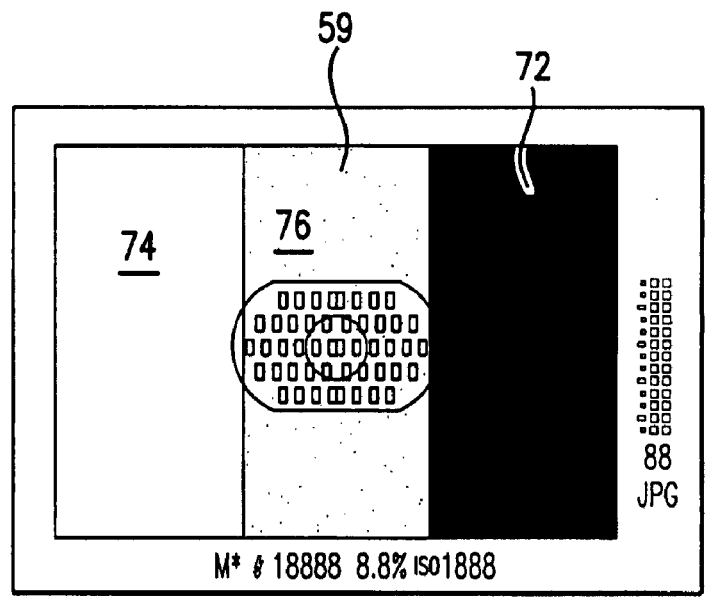
FIG. 11 is a corrected image of the second embodiment of the calibration target in the view finder of the camera.
Figure 12:
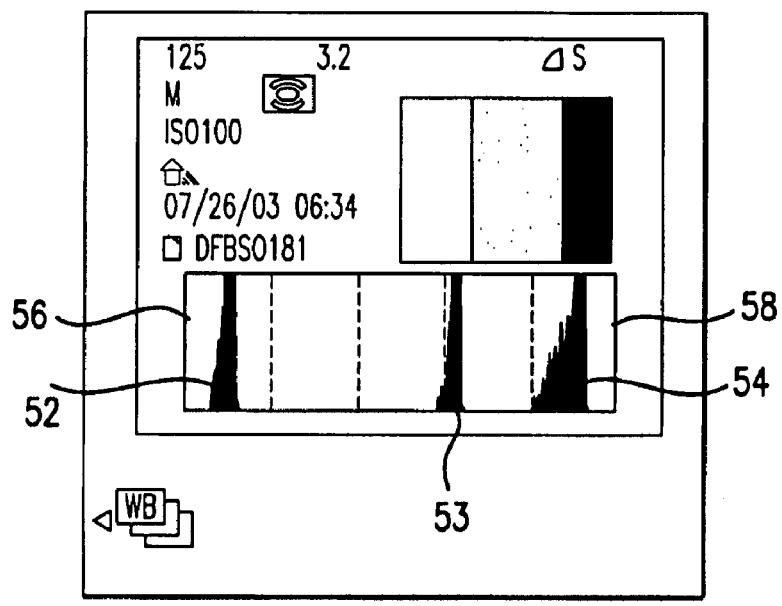
FIG. 12 is a corrected histogram display for the corrected image of FIG. 11.

Referring now to FIGS. 8-12, a second embodiment 70 of the calibration target is disclosed wherein the calibration target includes a black target area 72, a white target area 74 and a middle gray target area 76. The middle gray target area 76 is 50% gray, i.e. halfway between the black target area 72 and the white target 74. As is seen in FIGS. 10 and 12, there is a middle target area spike 53 between the black target area spike 52 and the white target area 54. The middle spike 53 represents the gray area and is used to indicate whether the spikes 52 and 54 are shifted left or right.

In FIG. 10 the spikes 52 and 54 are shifted to the left with part of spike 52 being sheared off. This indicates that an under exposed image of the original scene with the subject 12 will occur if the setting obtained from the light meter 22 are used. The exposure settings of the camera 24 are then corrected to shift the spikes 52, 53 and 54 to the right as is shown in FIG. 12. The entire spike 52 is then inside the boundary 56 with the spike remaining inside boundary 58.

While not its primary purpose or design, because the calibration target 40 or 70 contains known values for highlight, mid tone and shadow, it can be useful for back end correction when included in an original scene. While this is a desirable feature, it is primarily a convenience so that a photographer does not have to carry multiple adjustment tools in case a mistake is made and backend corrections are necessary.

Figure 8:
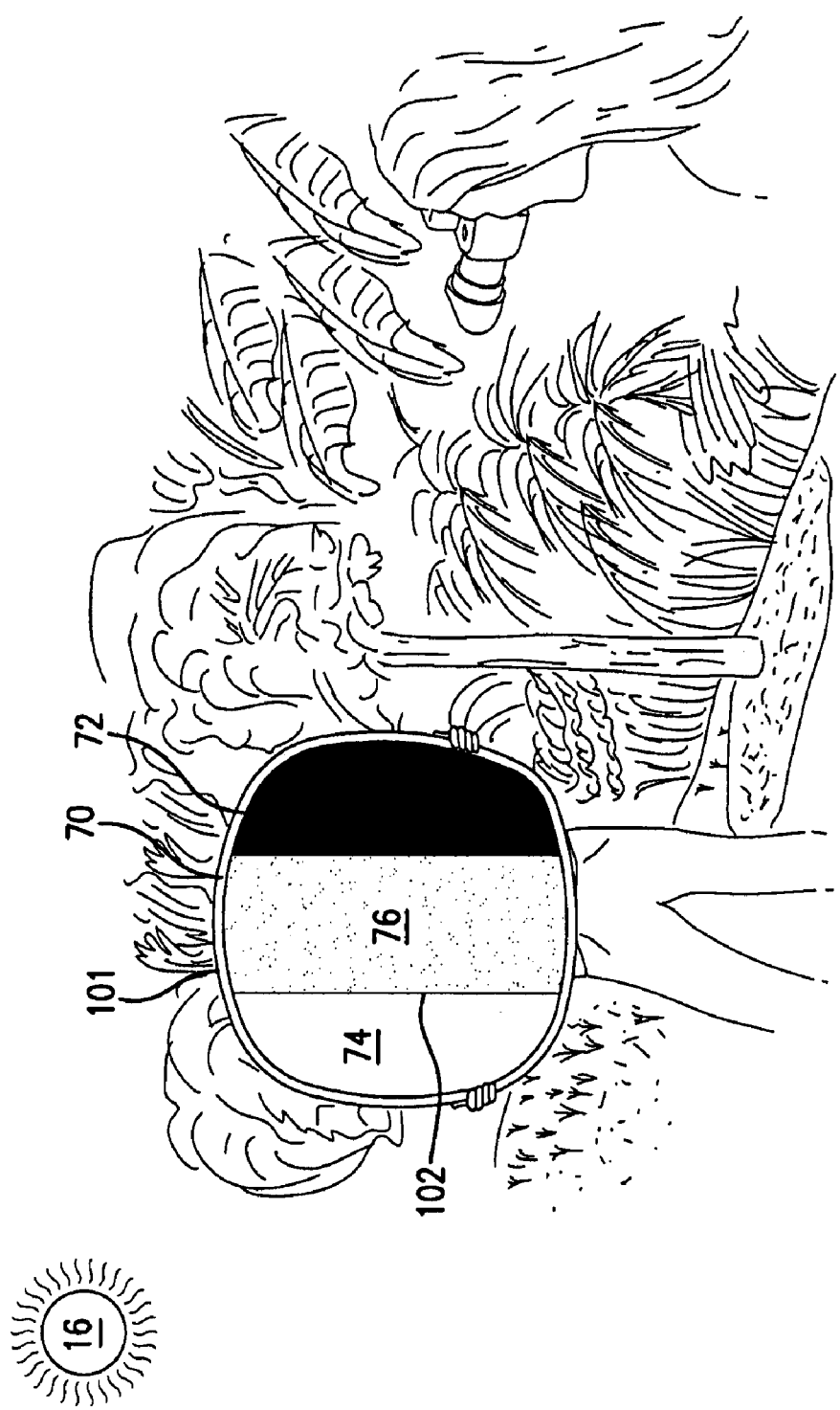
FIG. 8 is a perspective view showing a second embodiment of a calibration target configured in accordance with the present invention.
Figure 9:
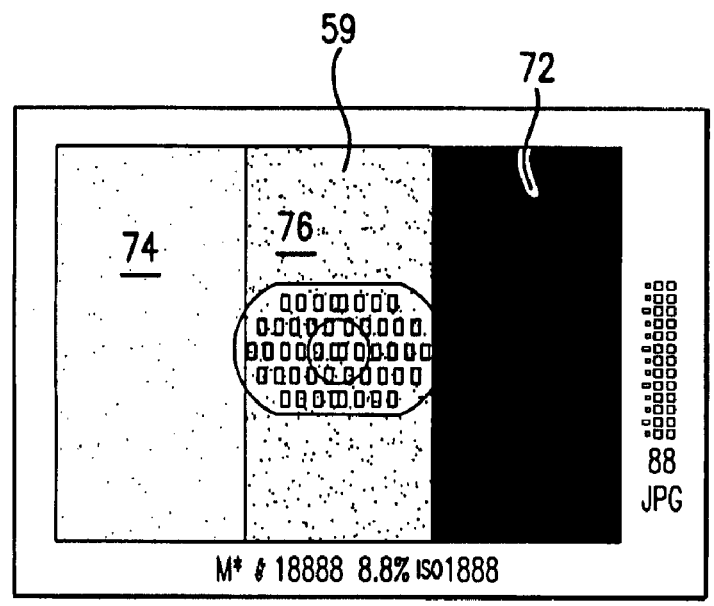
FIG. 9 is an uncorrected image of the second embodiment of the calibration target in the view finder of the camera.

A single gray target area 76 is shown in FIG. 8, which is equal in area to the target areas 72 and 74. In accordance with a further embodiment of the invention, there may be two or more gray target areas, each having a tone different from the gray area 76. These additional gray areas will each have an area equal to the black and white target areas 72 and 74, and the single target area 76. By having multiple tones for the gray scale, finer level adjustments may be made on the backend after the image of the original scene has been recorded.

Figure 13:
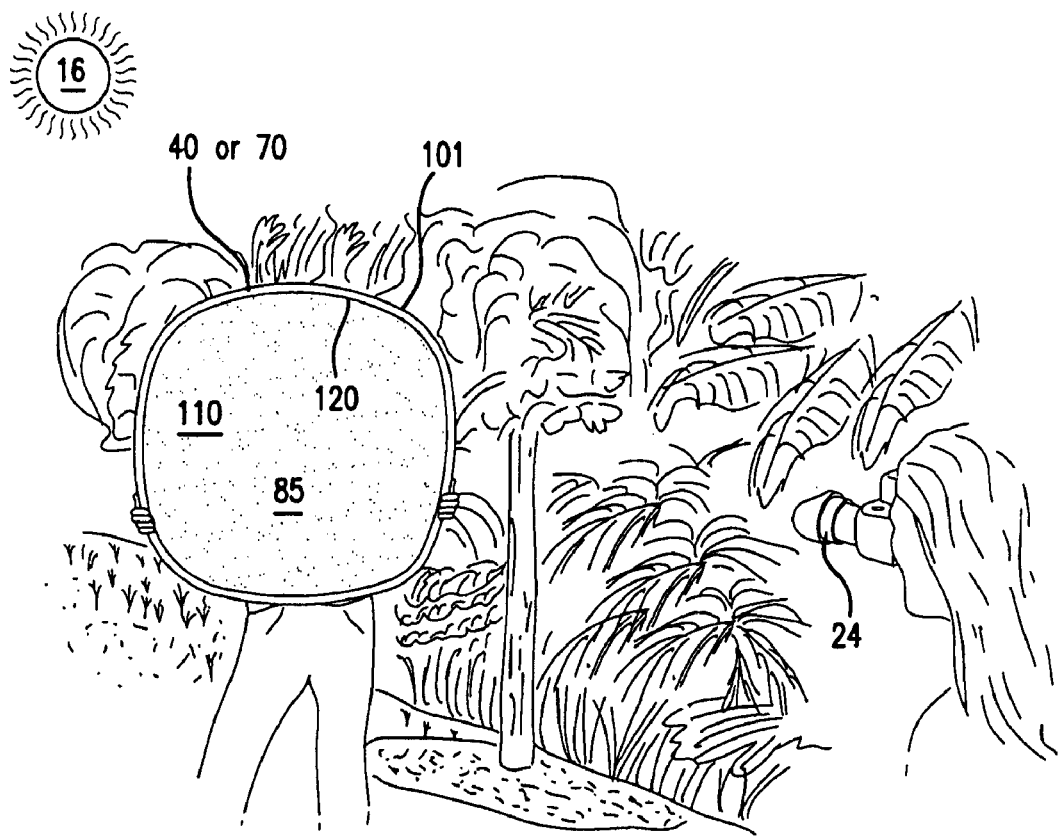
FIG. 13 is a perspective view of a white or gray neutral target for achieving proper white balance at the image scene of FIG. 1.

Referring now to FIG. 13, in conjunction with the calibration target 40 or 70 there is shown a neutral target area 85 that is either white or neutral gray, which neutral target area substantially reflects all wave lengths of light neutrally without color bias. Subsequent to obtaining exposure settings using the calibration target 40 or 70, the neutral calibration target area 85 is focused upon and exposure made by the digital camera 24 in order to achieve white balance for the aforementioned corrected exposure settings. Most cameras 24 provide several options for white balance by providing settings on a menu for daylight, flash, overcast skies, tungsten lighting and fluorescent lighting. These settings are generally not accurate because daylight varies depending on the time of day with the color temperature of daylight being different in the morning, midday and late afternoon. The difference in tungsten depends on how bright the tungsten light bulb really is and what the color temperature will be. All other preset settings also have variances and therefore these other settings can not be totally accurate either.

Figure 14:
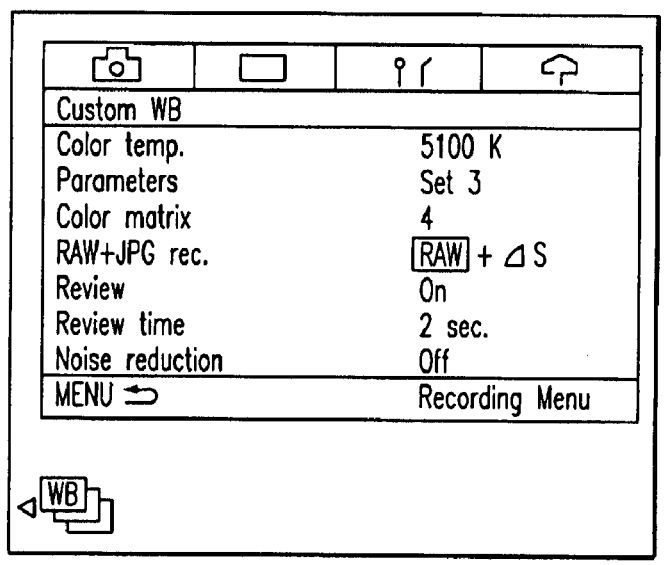
FIG. 14 is a display of custom white balance function determined by exposure to the white or gray neutral target of FIG. 13.
Figure 15:
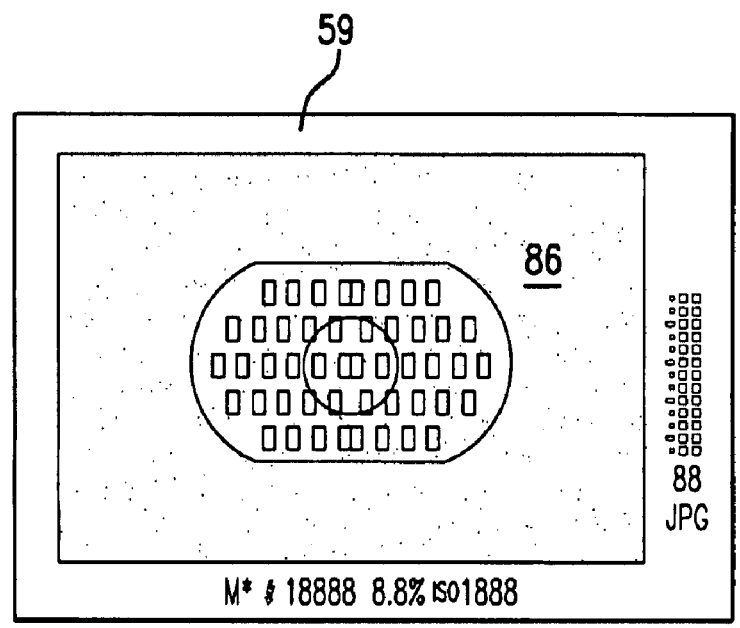
FIG. 15 is a view finder image of the white balance target of FIG. 13.
Figure 16:
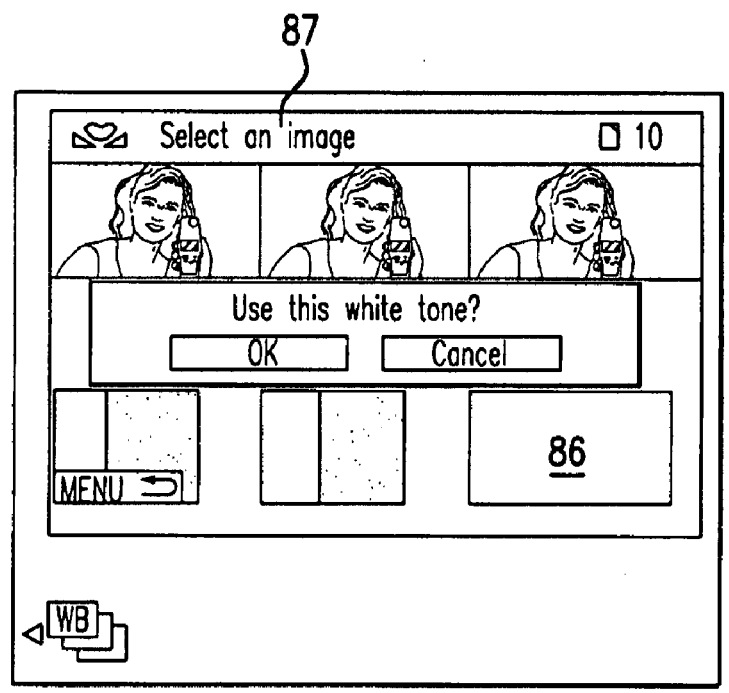
FIG. 16 is a tone selector display of an image taken using the white balance target of FIG. 13 for color balance.

Prior to exposing the image of an original scene 11, the menu on the digital camera 24 is accessed to select a custom white balance function illustrated in FIG. 14 and the set button pressed using as the white point the neutral target area 85. The camera 24 now has a clear white display 86 in the view finder 59 of FIG. 15. A tone selector display 87 of FIG. 16 is then used to select from the previously recorded images, images 86 of the neutral calibration target 85. The camera 24 has now been color corrected so that when the subject 12 is photographed, the colors of the image are identical thereto even though the color temperature is different. This allows one to customize the camera 24 so that the camera knows what the white point should be and by setting the white point you get perfect color images from the camera. Alternatively, white balance can be achieved prior to adjusting exposure by relying on handheld meter or the camera meter to achieve a base exposure, and then following the custom white balance procedures as outlined above.

As long as the settings for exposure are correct, as obtained by using the calibration targets 40 and 70 of FIGS. 3 and 8, and as long as the white balance is correctly set, it does not matter what light source 16 is utilized. The photographer will get consistent color, and when the subject 12 is put in front of the camera, the subject will look exactly the same to the camera. Different custom white balances may be stored in the memory of the camera 24 so that each time situations or locations 10 are changed, the appropriate white balance settings can be clipped to the situations so that they can be set up in advance. For example, a wedding photographer might set white balance at the front of the church, white balance for the back of the church and white balance for outside the church. As the photographer moves to each of these locations, the photographer picks a correct custom white balance settings for that location.

Referring now more specifically to FIGS. 8 and 13, the specific calibration target 70 used in practicing the principles of the present invention is in the form of panels 101 having a first side 102 with the black target area 72, the white target area 74 and the gray target area 76 providing an exposure setting calibration target. On a second side 110 of the panel 101 there is the neutral target area 85 which is gray or white providing white balance as described in FIGS. 13-16. The panel 101 is fabricated from four separate pieces of cloth fabric, with the black, white and gray target areas 72, 74 and 76 of the first side 102 being stitched together to form the calibration target for determining exposure settings, and the neutral white or gray target area 85 being fabricated from a single sheet of fabric to form the second side 110 of the panel. The first and second sides 102 and 110 of the panel 101 are stitched to a cloth tube 120 which contains a flat peripheral spring which has flat sides facing radially.

Figure 17:
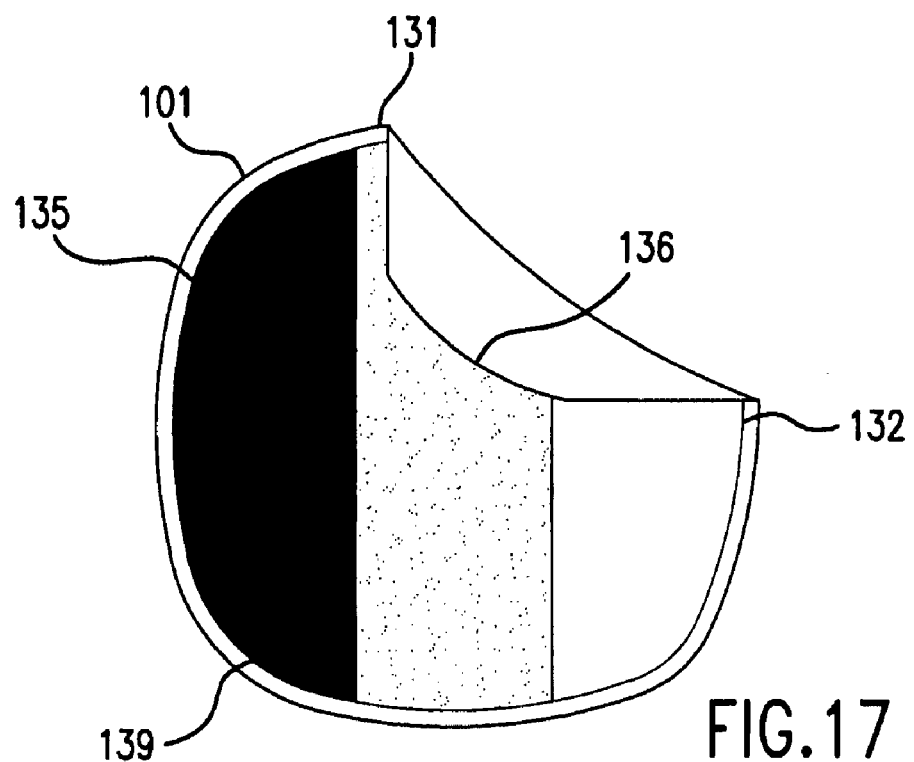
FIG. 17 is a planar view of the calibration target of FIGS. 3, 8 and 13 being folded.
Figure 18:
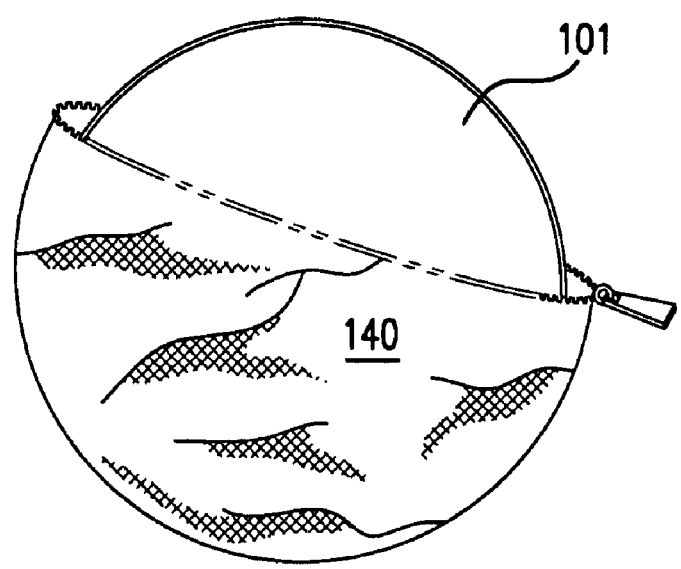
FIG. 18 is a view of the calibration target folded in accordance with FIG. 17 being inserted into a carrying pouch.

As is seen in FIGS. 17 and 18, the panel 101 has relatively straight edges 130-133 joined by curved edge portions 135-139 so that the panel 101 is foldable into overlapping portions. The panel can then be inserted into a zippered pouch 140 for convenient carrying.

From the foregoing description, one skilled in the art can easily ascertain the essential characteristics of this invention, and without departing from the spirit and scope thereof, can make various changes and modifications of the invention to adapt it to various usages and conditions.

I claim:

1. A target in combination with a digital camera primarily configured to produce single images and having exposure settings within the digital camera for calibrating the digital camera prior to exposing images of a scene to image sensors in the camera, the target comprising:
   at least a neutral white target area reflecting substantially all wave lengths of visible light incident thereon, and
   at least a neutral black target area absorbing substantially all wave lengths of visible light incident thereon;
   the neutral white and neutral black target areas having substantially equal areas, wherein simultaneous exposure of the image sensors to the target at locations of original scenes selects desired exposure settings within the digital camera for images at the scenes prior to exposure.

2. The target of claim 1 wherein the black and white target areas are continuous.

3. The target of claim 1 wherein the black and white target areas have at least portions which are discontinuous.

4. The target of claim 1 wherein the white and black target areas are separate.

5. The target of claim 4 wherein the white target area is at least trapezoidal and the black target area is at least trapezoidal.

6. The target of claim 1 further including at least one gray target area which substantially reflects all wave lengths of light without color bias.

7. The target of claim 6 further including more than one gray target area, each having a substantially different tone.

8. The target of claim 7 wherein each gray target area has an amount of target area substantially equal to the amount of black target area and to the amount of white target area.

9. The target of claim 6 wherein the gray target area has an amount of target area substantially equal to the amount of black target area and to the amount of white target area.

10. The target of claim 6 further including a neutral white or gray target area without color bias, which when positioned at locations of scenes prior to recording images of the scenes determines settings for desired color balances for images of the scenes.

11. The target of claim 1 further including a neutral white or gray target area without color bias, which when positioned at locations of scenes prior to recording images of the scenes determines settings for desired color balances for the images.

12. The target of claim 11 wherein the black and white target areas are juxtaposed and planar.

13. The target of claim 12 wherein the black and white target areas are on a first surface of a panel and a neutral target area is on a second surface of the panel.

14. A target for calibrating a digital camera configured primarily to produce single images prior to exposing at least one image to image sensors therein, the target comprising:
   a panel having a first surface and a second surface, the first side having substantially equal amounts of neutral white target area, neutral black target area and neutral gray target area without color bias, the second surface having a neutral white or neutral gray target area without color bias;
   wherein exposure of the image sensor in the digital camera to the first surface of the panel at a location of an image prior to recording the image determines settings within the digital camera for a desired exposure of the image, and exposure of the image sensor to the second surface of the panel positioned at the location of the image determines settings for a desired color balance for the image.

15. The target of claim 14 wherein the panel is foldable.

16. A method of calibrating a digital camera having an exposure setting comprising:
   prior to exposing an image of an original scene to an image sensor within the camera, exposing the image sensor to a calibration target located at the original scene, the calibration target having at least a neutral white target area which reflects substantially all wave lengths of visible light and a neutral black target area which absorbs substantially all wave lengths of visible light;
   adjusting the exposure setting within the camera for the target until an adjusted exposure setting for black and white detection is substantially balanced within the camera for a selected intensity of and distribution of light at the original scene, and
   exposing the image sensor to the scene using the adjusted exposure setting to digitally photograph the image.

17. The method of claim 16 wherein adjusting the exposure is performed by viewing a histogram display within the digital camera and adjusting the exposure setting of the camera until spikes representing black and white detection are not offset laterally in the histogram display so as to provide the adjusted exposure setting.

18. The method of claim 16 further including exposing the image sensors to at least one neutral gray target area simultaneously with exposure to the neutral white and neutral black target areas.

19. The method of claim 18 wherein adjusting the exposure is performed by viewing a histogram display within the digital camera and adjusting the exposure setting of the camera until spikes representing black and white detection are not offset laterally in the histogram display so as to provide the adjusted exposure setting.

20. The method of claim 18 further including saving the adjusted exposure setting for the exposure balanced image and exposing the exposure calibrated image to a substantially neutral target area without color bias that reflects equally substantially all wave lengths of visible light to produce settings for a color balanced calibrated image having a selected white balance for the original scene.

21. The method of claim 16 further including the step of obtaining an initial exposure setting of the location prior to exposing the image sensor to the calibration target and adjusting the exposure to the target from the neutral exposure settings.

22. A method of digital photography comprising:
   prior to exposing an image of an original scene to an image sensor within a digital camera, exposing an image sensor therein to a calibration target located at the original scene, the calibration target having at least a substantially neutral white area which reflects substantially all wave lengths of visible light indicative of highlights and a substantially neutral black area which absorbs substantially all wave lengths of visible light indicative of shadows, and
   adjusting settings of the exposure to the target until black and white detection is substantially balanced within the camera for a selected light intensity to provided proper highlight and shadow sensitivity;
   storing settings indicative of substantially balanced black and white detection; and
   exposing the image sensor to the original scene to record an image of the original scene having proper highlight and shadow sensitivity.

23. The method of digital photography of claim 22 further including the step of obtaining an initial exposure setting of the location prior to exposing the image sensor to the calibration target and adjusting the exposure to the target from the neutral exposure settings.

24. The method of digital photography of claim 23 further including exposing other images positioned at the original scene to the image sensor using the stored settings previous derived from exposure to the calibration target.

25. The method of digital photography of claim 23 further including saving the adjusted exposure setting for the exposure balanced image and exposing the exposure calibrated image to a substantially neutral target area without color bias that reflects equally substantially all wave lengths of visible light to produce settings for a color balanced calibrated imagen having a selected white balance for the original scene.

26. The method of digital photography of claim 23 further including exposing the image sensors to at least one substantially neutral gray target area simultaneously with exposure to the white and black target areas.

27. A target for calibrating digital cameras configured primarily to produce single images prior to exposing at least one image to image sensors therein, the target comprising:
   a panel having a first surface and a second surface, the first surface having substantially equal amounts of neutral white target area, neutral black target area and neutral gray target area without color bias, the second side having a reflective surface;
   wherein exposure of the image sensors in digital cameras to the first side of the panel at a location of an image prior to recording the image determines settings for a desired exposure of the image, and determines settings for a desired colored balance for the image.

28. The target of claim 27 wherein the target is made of a fabric supported with an integral foldable frame.

29. A method of calibrating a digital camera configured primarily to produce single images comprising:
   prior to exposing an image of an original scene to an image sensor within the camera, exposing the image sensor to a calibration target located at the original scene, the calibration target having at least a substantially neutral white target area which reflects substantially all wave lengths of visible light and is without color bias, a substantially neutral gray target area which reflects substantially all wave lengths of visible light and is without color bias; and a neutral black target area which absorbs substantially all wave lengths of visible light and is without color bias;

adjusting exposure setting for the target until an adjusted exposure setting for black and white detection is substantially balanced within the camera for a selected intensity and distribution of light at the original scene, and applying the adjusted exposure setting to photographing at least one image of the scene.

30. The method of claim 29 wherein adjusting the exposure is performed by viewing a histogram display within the digital camera and adjusting the exposure setting of the camera until spikes representing black and white detection are not offset laterally in the histogram display so as to provide the adjusted exposure setting.

31. The method of claim 30 further including referencing the target exposure from claim 30 to produce settings for other color balanced calibrated images of the original scene.

* * * * *

UNITED STATES PATENT AND TRADEMARK OFFICE
CERTIFICATE OF CORRECTION

PATENT NO.        : 7,248,284 B2
APPLICATION NO. : 10/636738
DATED             : July 24, 2007
INVENTOR(S)       : Alan Pierce It is certified that error appears in the above-identified patent and that said Letters Patent is hereby corrected as shown below:

Column 10, line 13 reads "to provided proper" should read -- to provide proper --
Column 10, line 37 reads "imagen having a selected" should -- image having a selected --

Signed and Sealed this

Eighteenth Day of March, 2008

JON W. DUDAS
*Director of the United States Patent and Trademark Office*